(12) United States Patent
Farmer et al.

(10) Patent No.: US 7,742,427 B2
(45) Date of Patent: Jun. 22, 2010

(54) INTERNAL LOOP-BACK ARCHITECTURE FOR PARALLEL SERIALIZER/DESERIALIZER (SERDES)

(75) Inventors: Michael Martin Farmer, Fort Collins, CO (US); Robert J. Martin, Timnath, CO (US); Peter Meier, Fort Collins, CO (US)

(73) Assignee: Avago Technologies Enterprise IP (Singapore) Pte. Ltd., Singapore (SG)

( * ) Notice: Subject to any disclaimer, the term of this patent is extended or adjusted under 35 U.S.C. 154(b) by 164 days.

(21) Appl. No.: 12/037,185

(22) Filed: Feb. 26, 2008

(65) Prior Publication Data
US 2009/0213913 A1 Aug. 27, 2009

(51) Int. Cl.
*H04L 12/26* (2006.01)
(52) U.S. Cl. .................................................. 370/249
(58) Field of Classification Search .................. 370/249
See application file for complete search history.

(56) References Cited

U.S. PATENT DOCUMENTS

| | | | | |
|---|---|---|---|---|
| 7,388,904 B2 * | 6/2008 | Raghavan et al. | ............ | 375/219 |
| 7,526,033 B2 * | 4/2009 | Sindalovsky et al. | ........ | 375/257 |
| 2003/0149922 A1 * | 8/2003 | Lai | ............................ | 714/724 |
| 2006/0198315 A1 * | 9/2006 | Sasagawa et al. | ............ | 370/244 |

* cited by examiner

*Primary Examiner*—Derrick Ferris
*Assistant Examiner*—Mang Yeung

(57) ABSTRACT

An internal loop-back architecture for a parallel serializer/deserializer (SERDES) includes a transmitter macro including a plurality of transmit elements arranged in a parallel architecture, and a receiver macro including a plurality of receive elements arranged in a parallel architecture, wherein at least a portion of the transmit elements and a portion of the receive elements share a communication channel and wherein any of the plurality of transmit elements in a row can communicate with any of the plurality of receive elements in a row, and wherein each of the plurality of transmit element includes a loop-back arrangement with each of the plurality of receive elements.

16 Claims, 11 Drawing Sheets

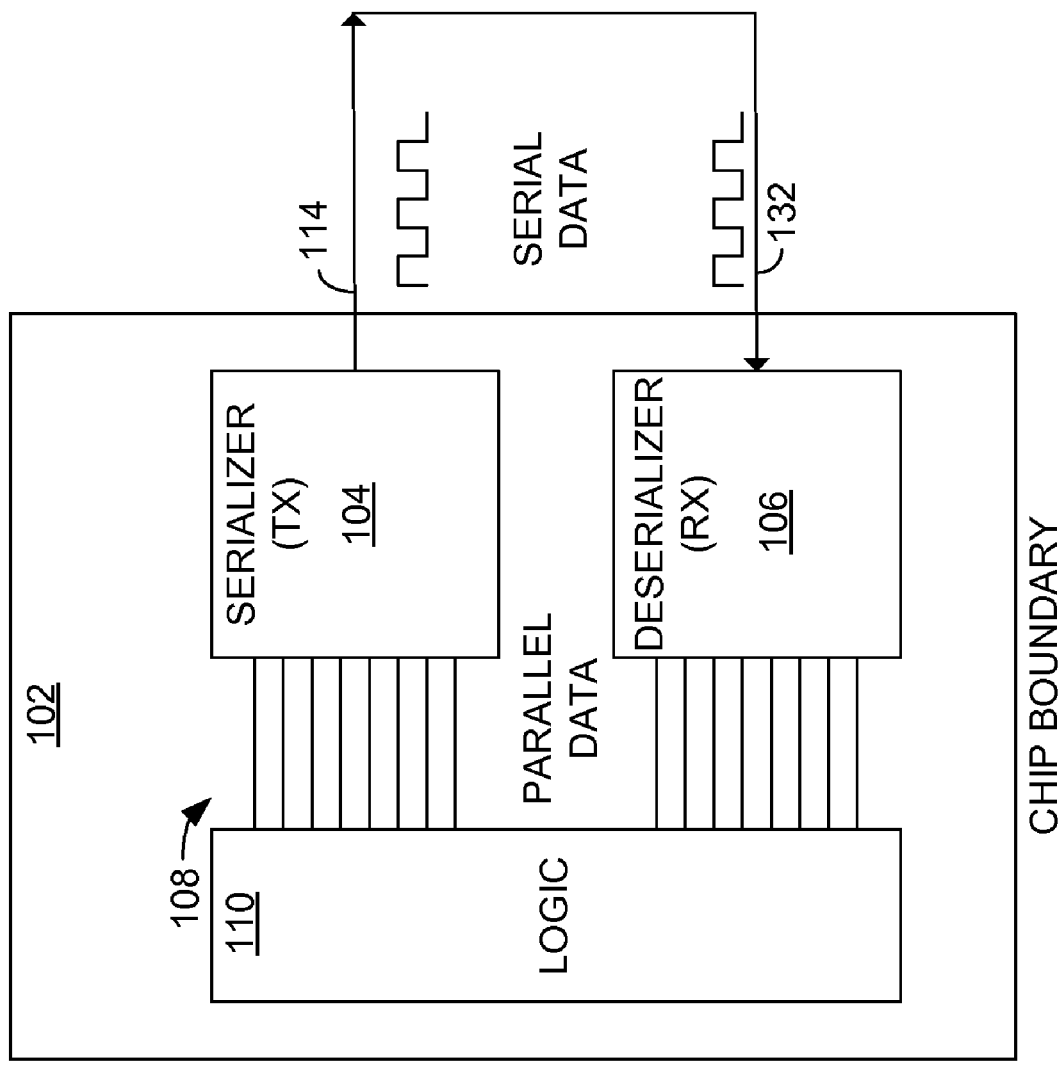

INTERNAL LOOP-BACK ARCHITECTURE FOR PARALLEL SERIALIZER/DESERIALIZER (SERDES)

BACKGROUND

A serializer/deserializer (SERDES) circuit typically comprises circuitry configured to transmit parallel data over a serial communications channel. Typically, a multiplexer receives parallel data and converts the parallel data to serial data. A transmitter receives serial data and transmits the serial data over a serial communication channel. A receiver receives the serial data and forwards the serial data to a demultiplexer, which recreates and attempts to recover the original parallel data. Loopback testing is one of a number of different testing methodologies for testing transmitters and receivers associated with a SERDES circuit.

A SERDES circuit may be configured as a single channel SERDES, or as a parallel channel SERDES. In single channel SERDES circuits, loopback mechanisms were previously implemented to connect the receive (RX) channel to the transmit (TX) channel. Since, in a single channel SERDES, these circuits were located adjacent to each other, the connection was very simple. However for parallel SERDES architectures, the distance between the RX and TX devices, as well as the number of channels, complicates loopback testing.

Therefore, it would be desirable to have a way to implement loopback testing in a parallel SERDES architecture.

SUMMARY

In an embodiment, an internal loop-back architecture for a parallel serializer/deserializer (SERDES) includes a transmitter macro including a plurality of transmit elements arranged in a parallel architecture, and a receiver macro including a plurality of receive elements arranged in a parallel architecture, wherein at least a portion of the transmit elements and a portion of the receive elements share a communication channel and wherein any of the plurality of transmit elements in a row can communicate with any of the plurality of receive elements in a row, and wherein each of the plurality of transmit element includes a loop-back arrangement with each of the plurality of receive elements.

Related embodiments and methods of operation are also provided. Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1B is a block diagram illustrating a non-parallel SERDES circuit configured for external loopback operation.

DETAILED DESCRIPTION

Embodiments of the internal loop-back architecture for parallel SERDES to be described below will be described in the context of an integrated circuit, or a number of integrated circuit portions formed on a single die, also referred to as a "chip." However, the internal loop-back architecture for parallel SERDES circuit can be implemented in any circuitry in which it is desirable to have a variety of internal testing applications for parallel SERDES circuits. As used herein, the term "parallel" refers to any number of transmitters and receivers simultaneously capable of outputting and receiving data.

Further, although the architecture and operation of the internal loop-back architecture for parallel SERDES will be described below in the context of a transmitter and a receiver, other functional blocks in a SERDES to be described below can use the internal loop-back architecture for parallel SERDES.

Figure 1A:
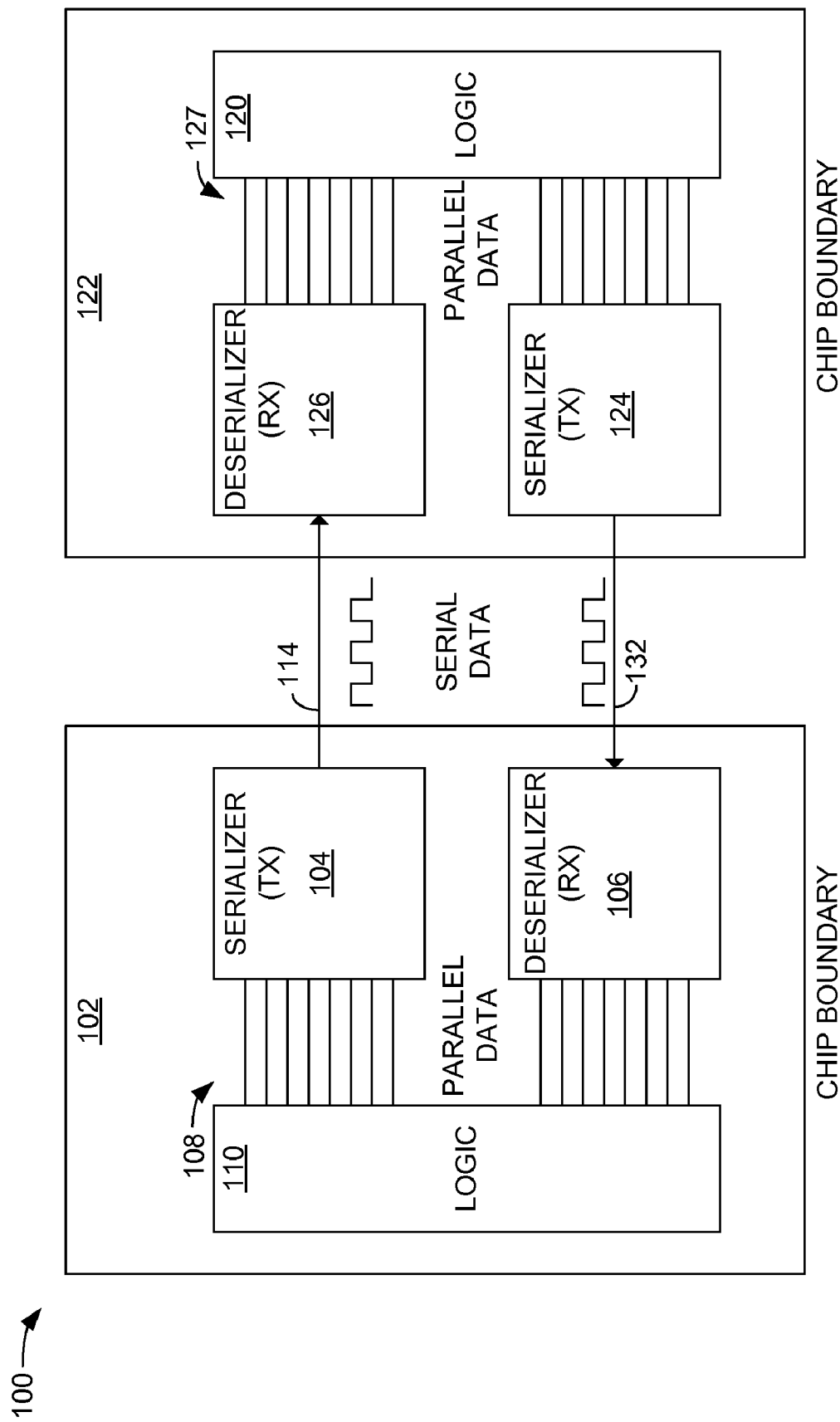
FIG. 1A is a block diagram illustrating a basic serializer/deserializer (SERDES) circuit.

FIG. 1A is a block diagram illustrating a basic serializer/deserializer (SERDES) circuit 100. The SERDES circuit 100 includes a serializer/deserializer (SERDES) 102, which includes a serializer 104 and a deserializer 106. The serializer 104 is sometimes referred to as a transmitter (TX) and the deserializer 106 is sometimes referred to as a receiver (RX). The SERDES also includes arbitrary logic 110.

The circuit 100 also includes a SERDES 122. The SERDES 102 is located on a different chip than the SERDES 122. The SERDES 122 includes a serializer 124 and a deserializer 126. The serializer 124 is sometimes referred to as a transmitter (TX) and the deserializer 126 is sometimes referred to as a receiver (RX). The SERDES also includes arbitrary logic 120.

In this simplified example, the serializer 104 is coupled to the deserializer 126 via a forward path 114 and the deserializer 106 is coupled to the serializer 124 via a reverse path 132. The forward path 114 and the reverse path 132 comprise a single serial communication channel. In some applications, the SERDES 102 and the SERDES 122 may be coupled together using a communication channel that uses more than one physical connection. However, the SERDES 102 and the SERDES 122 are typically coupled together using a communication channel that uses fewer connections than the number of parallel connections 108 that are input to the serializer 104 or output from the deserializer 106.

The logic 110 generates a parallel data stream over parallel connection 108. In this example, the number of parallel connections 108 is eight (8), but this is arbitrary. Typically, the number of parallel connections 108 is many tens, or hundreds. The serializer 104 receives the parallel data over connections 108 and serializes the data for transmission over the forward path 114.

In this example, the deserializer 126 receives the serial data stream over forward path 114 and converts it to a parallel data stream on connections 127. The parallel data stream is supplied to the logic 120.

To illustrate the operation of the reverse path 132, the logic 120 generates a parallel data stream over parallel connection 127. In this example, the number of parallel connections 127 is eight (8), but this is arbitrary. Typically, the number of parallel connections 127 is many tens, or hundreds. The serializer 124 receives the parallel data over connections 127 and serializes the data for transmission over the reverse path 132.

In this example, the deserializer 106 receives the serial data stream over the reverse path 132 and converts it to a parallel data stream on connections 108. The parallel data stream is supplied to the logic 110.

FIG. 1B is a block diagram illustrating a non-parallel SERDES circuit configured for external loopback operation. In the example shown in FIG. 1B, the serializer 104 is coupled via the forward path 114 and the reverse path 132 to the deserializer 106. In this mode of operation, the output of the serializer 104 is provided directly to the deserializer 106.

Figure 1C:
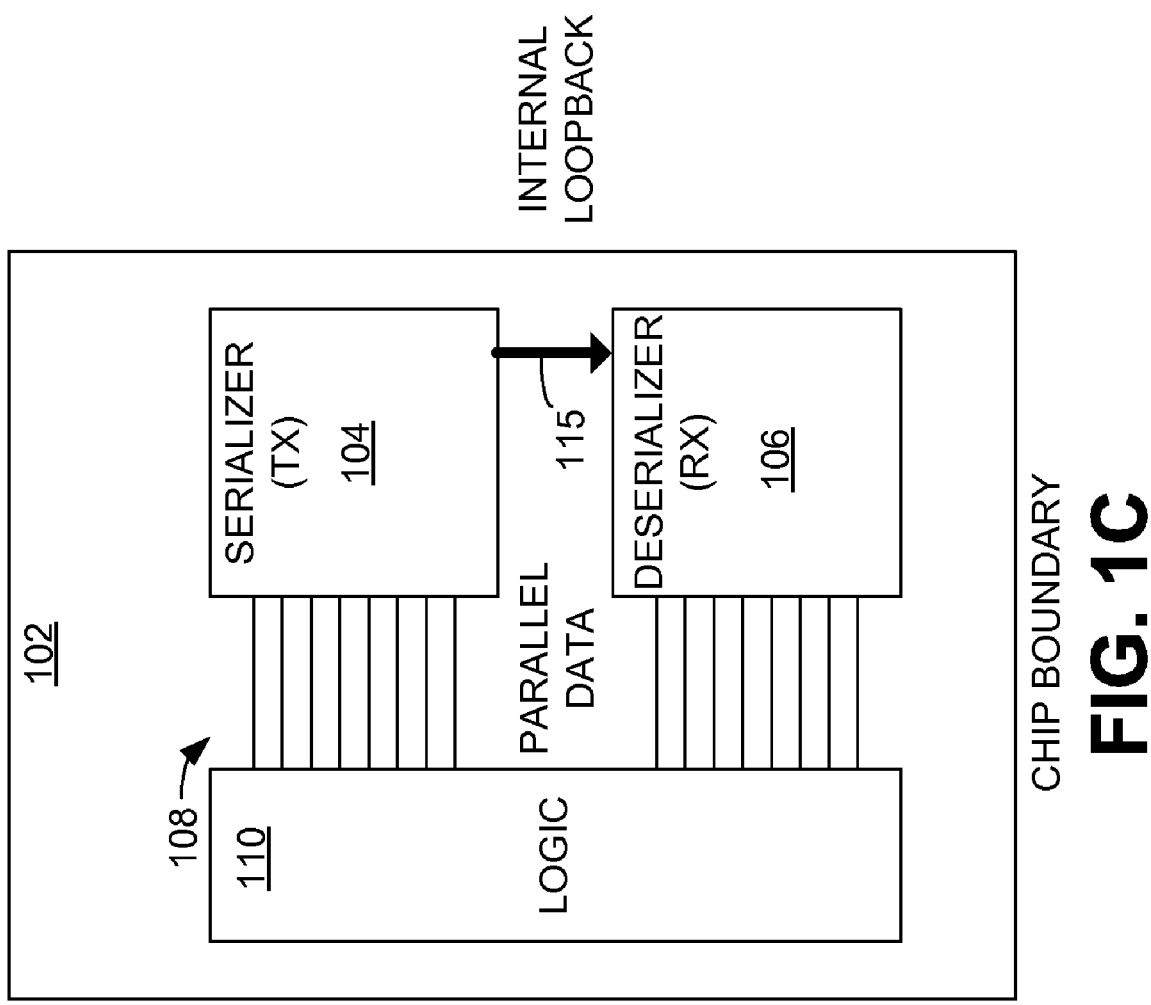
FIG. 1C is a block diagram illustrating a non-parallel SERDES circuit configured for internal loopback operation.

FIG. 1C is a block diagram illustrating a non-parallel SERDES circuit configured for internal loopback operation. In the example shown in FIG. 1C, the serializer 104 is coupled via an internal connection 115 to the deserializer 106. In this mode of operation, the output of the serializer 104 is provided directly to the deserializer 106, as described above in FIG. 1B, but the connection is made internal to the chip on which the SERDES 102 is located.

Figure 1D:
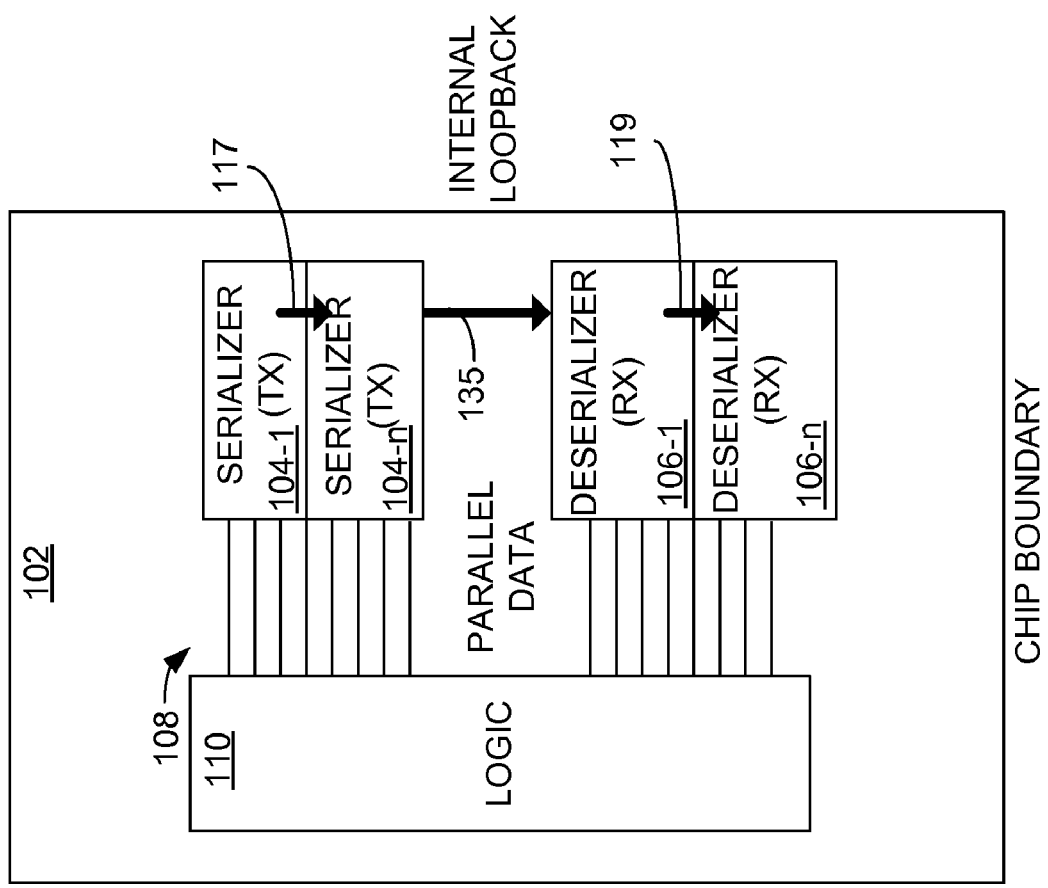
FIG. 1D is a block diagram illustrating a parallel SERDES circuit configured for internal loopback operation.

FIG. 1D is a block diagram illustrating a parallel SERDES circuit configured for internal loopback operation. In the example shown in FIG. 1D, a plurality of serializers 104-1 through 104-n are connected via an internal loopback connection 135 to a plurality of deserializers 106-1 through 106-n. The plurality of serializers 104-1 through 104-n are coupled via an internal connection, referred to as 117. However, the connection 117 is not a single connection, but instead, is a daisy chain connection structure, which will be described below. The plurality of deserializers 106-1 through 106-n are coupled via an internal connection, referred to as 119. However, the connection 119 is not a single connection, but instead, is a daisy chain connection structure, which will be described below. In this mode of operation, the output of any of the serializers 104-1 through 104-n is provided directly to any of the deserializers 106-1 through 106-n with the connection being made internal to the chip on which the SERDES 102 is located.

Figure 1E:
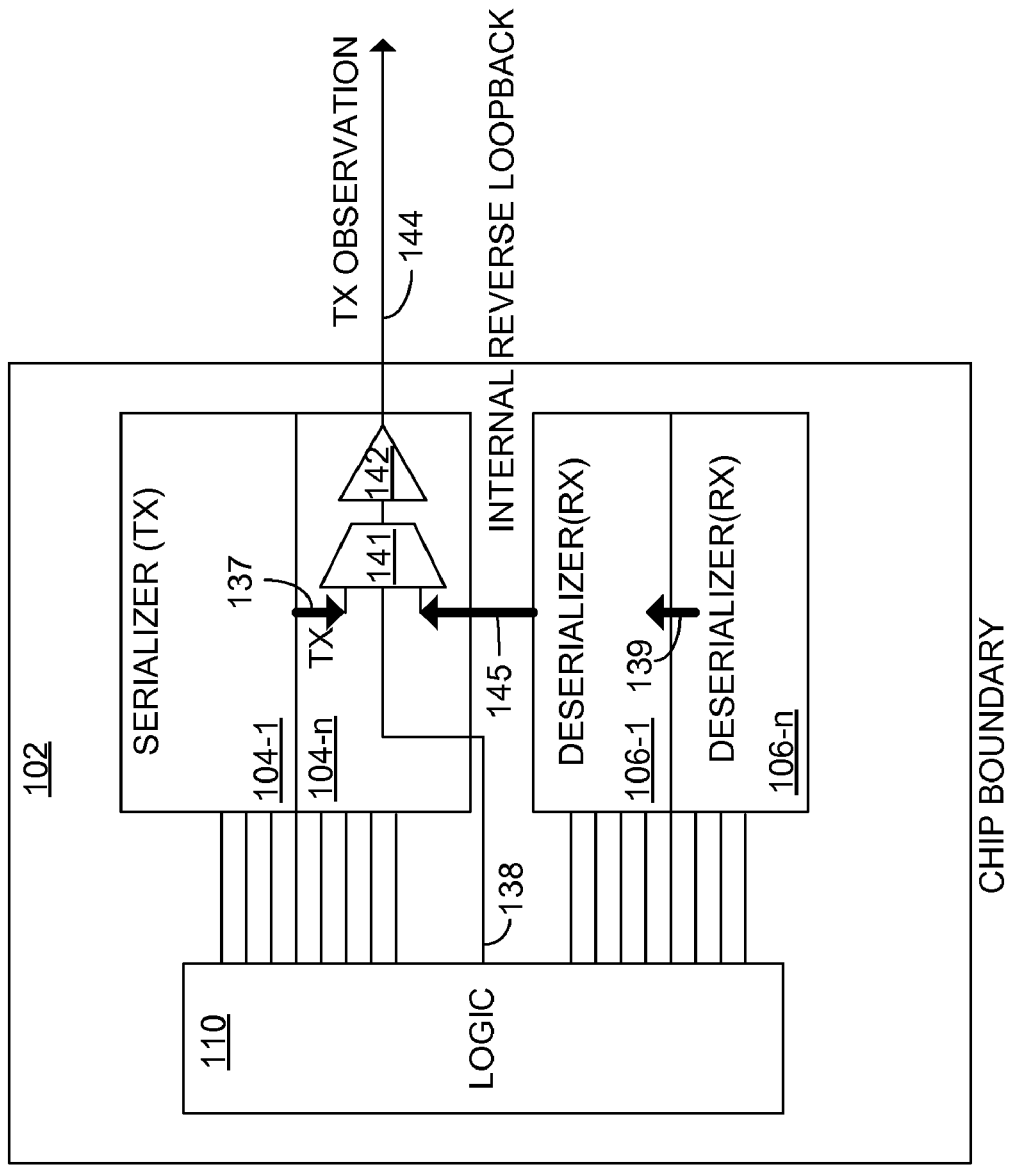
FIG. 1E is a block diagram illustrating a parallel SERDES circuit including a loopback block for observation of high speed signals.

FIG. 1E is a block diagram illustrating a parallel SERDES circuit including a loopback block for observation of high speed signals. In the example shown in FIG. 1E, a plurality of serializers 104-1 through 104-n are connected via an internal loopback connection 145 to a plurality of deserializers 106-1 through 106-n. The plurality of serializers 104-1 through 104-n are coupled via an internal connection, referred to as 137. However, the connection 137 is not a single connection, but instead, is a daisy chain connection methodology, which will be described below.

In the example shown in FIG. 1E, the serializer 106-n is illustrated as including a multiplexer 141 and a driver 142. The input to the multiplexer 141 can be taken from the serializer 104-1 via connection 137, from the logic 110 via connection 138, or from the deserializer 106-1 via connection 145.

The plurality of deserializers 106-1 through 106-n are coupled via an internal connection, referred to as 139. However, the connection 139 is not a single connection, but instead, is a daisy chain connection methodology forming a reverse path, which will be described below. In this mode of operation, the output of any of the serializers 104-1 through 104-n can be provided directly to the serializer 104-n, so that any transmitter (serializer) output can be observed over connection 144.

Similarly, the output of any of the deserializers 106-1 through 106-n can be provided directly to the serializer 104-n, so that any receiver (deserializer) output can be observed over connection 144.

Further, any signal on the logic 110 can be provided to the multiplexer 141 for observation over connection 144.

Figure 2:
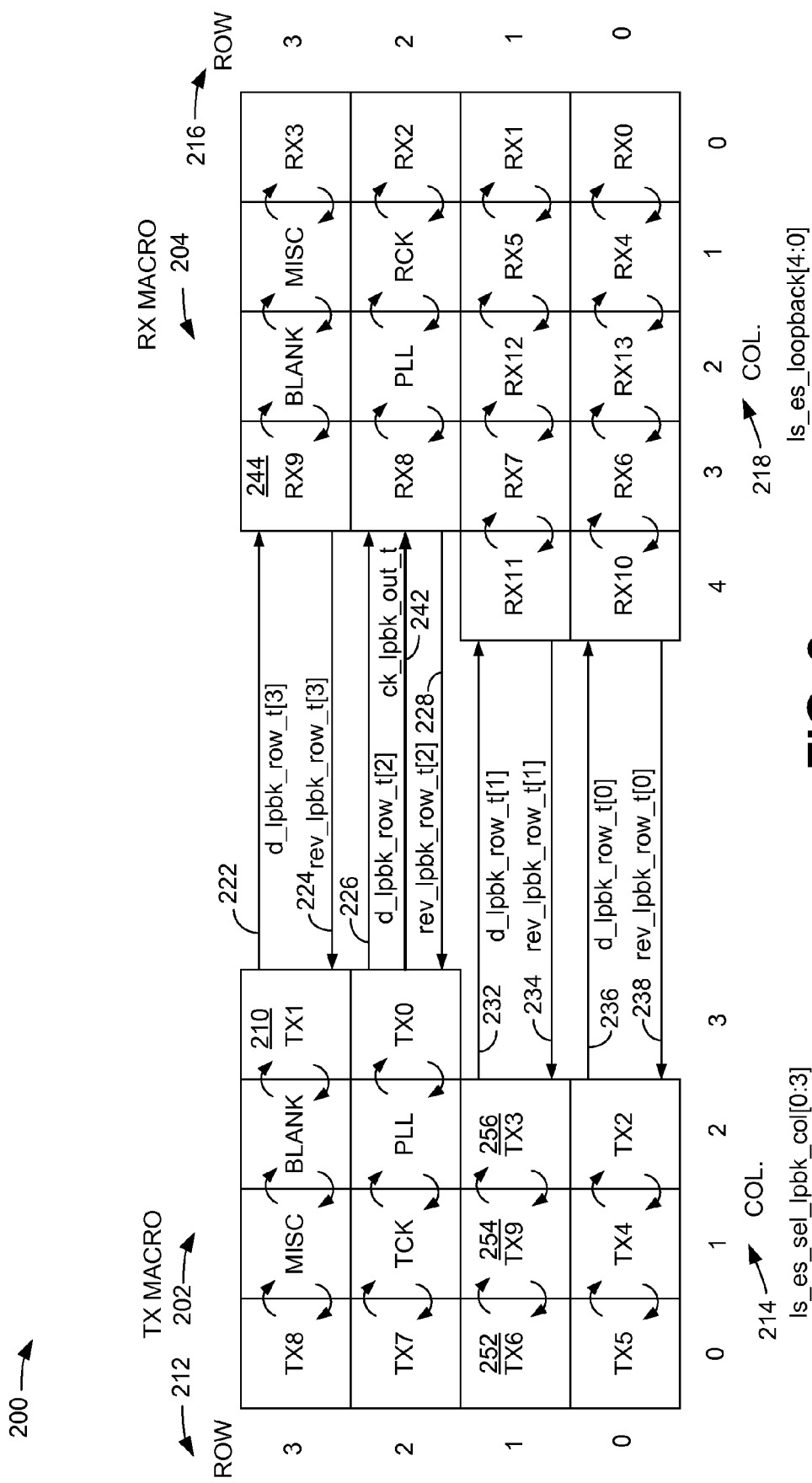
FIG. 2 is a schematic diagram illustrating an example of a transmitter macro and a receiver macro of the SERDES circuit of FIG. 1.

FIG. 2 is a schematic diagram 200 illustrating an example of a transmitter macro and a receiver macro of the SERDES circuit of FIG. 1D or 1E. A transmitter macro is illustrated using reference numeral 202 and a receiver macro is illustrated using reference numeral 204. The term "macro" as used herein refers to the physical layout of a plurality of circuit blocks, or elements, on a transmitter and a receiver of a SERDES circuit. An exemplary circuit element having a transmitter is illustrated at 210 and an exemplary circuit element having a receiver is illustrated at 244. In this embodiment, the transmitter macro 202 includes ten transmitters (TX0 through TX9), a miscellaneous block (MISC), a blank block (BLANK), a transmit clock block (TCK) and a phase locked loop block (PLL). In this embodiment, the receiver macro 204 includes fourteen receivers (RX0 through RX13), a blank block (BLANK), a miscellaneous block (MISC), phase locked loop block (PLL), and a receive clock block (RCK). Any of the blocks on the transmitter macro 202 and the receiver macro 204 that include a transmitter and a receiver can implement the internal loop-back architecture for a parallel SERDES to be described below. However, even if a block does not include a transmitter and a receiver, such as the blank block, the block can be daisy-chained as described below. For example, the blank block may include arbitrary circuitry or a bypass capacitance (not shown). However, there are no signals exiting the blank block so the loopback circuitry operates as a simple buffer. The bypass circuitry minimizes attenuation imparted by the absence of a transmitter and receiver, and minimizes the distance that a signal travels to reach the next daisy-chained loopback block.

In this example, the transmitter macro 202 includes rows 212 and columns 214. There are four rows labeled 0, 1, 2 and 3. There are four columns labeled 0, 1, 2 and 3. In this example, the receiver macro 204 includes rows 216 and columns 218. There are four rows labeled 0, 1, 2 and 3. There are five columns labeled 0, 1, 2, 3 and 4. The number of transmitter and receiver elements is arbitrary and based on specific design criteria. The number of transmitters and receivers may be equal or non-equal. All such variations are within the scope of the internal loop-back architecture for parallel SERDES described herein. Each of the transmitters and receivers is individually addressable using the row and column designation.

In the embodiment shown in FIG. 2, the transmitter 210 is connected to the receiver 244 over connections 222 and 224. The connection 222 can be thought of as a "forward" path and the connection 224 can be thought of as a "reverse" path.

However, the transmitter TX8, the block MISC and the block BLANK also use the connections 222 and 224 for communication. As illustrated using the arrows connecting adjoining blocks TX8, MISC, BLANK and TX1, the blocks TX8, MISC, BLANK and TX1 are connected in a daisy-chain manner, such that the signals leaving and entering the blocks TX8, MISC, BANK and TX1 also traverse the forward path 222 and the reverse path 224. Similarly, the receiver RX3, the block BLANK and the block MISC in the receiver macro 204 also use the forward path 222 and the reverse path 224 for communication. As illustrated using the arrows between adjoining blocks RX9, BLANK, MISC and RX3, the blocks RX9, BLANK, MISC, and RX3 are connected in a daisy-chain manner, such that the signals leaving and entering the blocks RX9, BLANK, MISC, and RX3 also traverse the forward path 222 and the reverse path 224.

In the embodiment shown in FIG. 2, the transmitter TX0 is connected to the receiver RX8 over forward path 226 and reverse path 228. However, the transmitter TX7, the block TCK and the block PLL also use the forward path 226 and the reverse path 228 for communication as described above. Similarly, the receiver RX2, the block RCK and the block PLL in the receiver macro 204 also use the forward path 226 and the reverse path 228 for communication as described above.

In this embodiment, a forwarded clock signal is communicated from the transmit macro 202 over connection 242 to the receiver macro 204. While the clock signal, ck_lpbk_out_t, is shown on connection 242 between the transmitter TX0 and the receiver RX8, an instance of the clock signal, ck_lpbk_out_t, occurs between each block on the transmitter macro 202 and the receiver macro 204 to allow timing synchronization.

In the embodiment shown in FIG. 2, the transmitter TX3 is connected to the receiver RX11 over forward path 232 and reverse path 234. The transmitters TX6, TX9 and TX3 are coupled as described above, the receivers RX11, RX7, RX12, RX5 and RX1 are also coupled as described above and communicate over the forward path 232 and the reverse path 234.

In the embodiment shown in FIG. 2, the transmitter TX2 is connected to the receiver RX10 over forward path 236 and reverse path 238. The transmitters TX5, TX4 and TX2 are coupled as described above, the receivers RX10, RX6, RX13, RX4 and RX0 are also coupled as described above and communicate over the forward path 236 and the reverse path 238.

The forward paths 222, 226, 232 and 236; and the reverse paths 224, 228, 234 and 238 are unique to each loopback block to be described below. That is, the output of the forward data of a transmitter or receiver element is connected to the input of the forward data to the subsequent adjacent block. Also the reverse output is connected to the reverse input of the previous adjacent block. This adjacent to adjacent connection model is known as "daisy chaining."

Each of the blocks in the transmitter macro 202 can communicate internally with any other block in the same row in this embodiment. For example, TX signals from the beginning of the row can be observed out of the transmitter at the end of the row. Similarly, the transmitter at the end of a row can send information back to the beginning of the row for observation at the output. This ability can be useful for debugging circuitry while one transmitter is performing normal operation. This same mechanism could also be used as a failover mechanism. For example, if one transmitter is failing, data can be re-routed to an adjacent transmitter and be output on a different path.

Each of the blocks in the receiver macro 204 can communicate internally with any other block in the same row of the receiver macro 204. Data forwarded from the transmitter macro 202 in the same row will available for all receivers of that row. The data can be used to verify the receiver macro without having to externally connect channels to the die. Arbitrary data, clocks, and debug signals can also be sent back to transmitters for observation during normal operation for debug purposes.

Figure 3A:
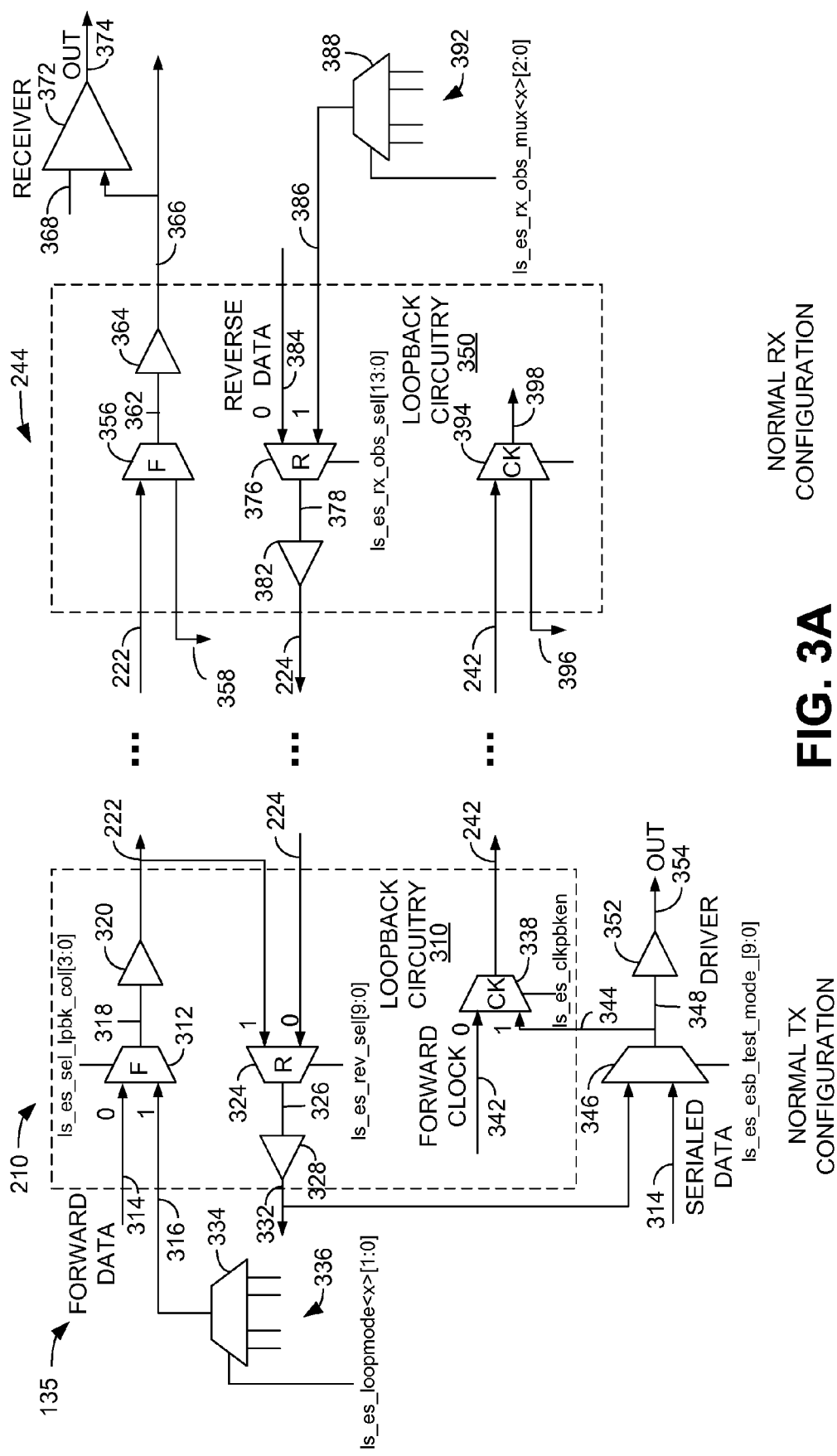
FIG. 3A is a schematic diagram illustrating a transmitter and receiver of FIG. 2 configured in an internal loopback arrangement.

FIG. 3A is a schematic diagram illustrating a transmitter and receiver of FIG. 2 configured in an internal loopback arrangement. Each of the blocks in the transmitter macro 202 and the receiver macro 204 in FIG. 2 can be interconnected as shown in FIG. 3A. The choice of using the transmitter 210 (TX1) and the receiver 244 (RX9) of FIG. 2 is made for ease of illustration only. The arrangement shown in FIG. 3A is a detailed explanation of the internal loopback connection 135 shown in FIG. 1D and the internal loopback connection 145 shown in FIG. 1E. The loopback circuitry is the same within the transmitter 210 and the receiver 244, although the configuration of the loopback circuitry differs from the transmitter 210 and the receiver 244.

The transmitter 210 includes transmitter loopback circuitry 310. The loopback circuitry 310 is also referred to as a "loopback block." The loopback circuitry 310 includes a transmit forward multiplexer 312, a transmit buffer 320, a reverse multiplexer 324 and a receive buffer 328. The transmitter loopback circuitry 310 also includes a transmit clock multiplexer 338, which directs a forwarded clock signal to the receiver 244. The forward multiplexer 312 receives forward data on connection 314 and receives one of a number of different test and arbitrary signals over connection 316 from a transmit test multiplexer 334. The transmit test multiplexer 334 supplies a variety of test and other signals on connections 336 that are outside of the data to be transmitted. The selection of the output of the transmit test multiplexer 334 is made by a signal, ls_es_loopmode<x>[1:0]. The selection of whether the forward multiplexer 312 will send a normal data signal from connection 314 or a test signal from connection 316 is made by a signal, ls_es_sel_lpbk_col[3:0]. The output of the forward multiplexer 312 is provided via connection 318 to the transmit buffer 320. The transmit buffer 320 buffers and amplifies the signal on connection 318 and provides a forward output over forward path 222.

In one mode of operation, referred to as "observation mode, an input of the reverse multiplexer 324 on forward path 222 receives the output of the transmit buffer 320. The reverse multiplexer 324 may also receive a reverse signal from the receiver 244 over reverse path 224. The selection of whether the reverse multiplexer 324 will receive the output of the transmit buffer 320 or the signal on connection 224 is made by a signal, ls_es_rev_sel[9:0]. The output of the reverse multiplexer is provided over connection 326 to the receive buffer 328.

The transmitter 210 also includes a multiplexer, referred to as an emphasis selection (EMP) multiplexer. The EMP multiplexer is the final multiplexer after the serialization of the data. It enables the transmitter to send either serialized data or test signals directly off chip without further retiming. The EMP multiplexer 346 receives the normal transmit data over connection 314 and receives the output of the receive buffer 328 over connection 332. The selection of whether the EMP multiplexer 346 will provide the normal transmit data or the output of the receive buffer 328 is made by a signal, ls_es_esb_test_mode[9:0]. The output of the EMP multiplexer 346 is provided over connection 348 to a transmit driver 352. The output of the transmit driver 352 is provided over connection 354.

The transmit clock multiplexer 338 can receive a forwarded clock signal over connection 342 from one or more adjacent transmitters or can receive the output of the EMP multiplexer 346 over connection 344. The selection of whether the transmit clock multiplexer 338 will provide the forwarded clock signal or the output of the EMP multiplexer 346 is made by a signal, ls_es_clkbken.

The receiver 244 includes receiver loopback circuitry 350. The receiver loopback circuitry 350 is also referred to as a "loopback block." The receiver loopback circuitry 350 includes a receive forward multiplexer 356, a receive buffer 364, a reverse multiplexer 376 and a reverse buffer 382. The receiver loopback circuitry 350 also includes a receive clock multiplexer 394, which receives a forwarded clock signal from the transmitter 210. The receive forward multiplexer 356 receives the signal on forward path 222. The connection 358 is coupled to ground, causing the forward multiplexer 356 to act as a buffer. The forward multiplexer 356 is present in the receiver 244 to demonstrate that the same circuitry can be used as the transmit loopback circuitry and the receiver loopback circuitry, with the differences being in the particular configurations. The output of the receive forward multiplexer 356 is provided over connection 362 to the receive buffer 364. The output of the receive buffer 364 is provided over connection 366 as an output of the receiver block 244 and also to the receiver 372. The output on connection 374 is forwarded to the next adjacent receiver block if present.

The reverse multiplexer 376 receives reverse data over connection 384 and receives an output of a receive test multiplexer 388 over connection 386. The receive test multiplexer 388 supplies a variety of test and other signals on connections 392 that can be sent to a transmitter to be observed. The selection of the output of the receive test multiplexer 388 is made by a signal, ls_es_rx_obs_mux<x>[2:0]. The selection of whether the reverse multiplexer 376 will send a normal reverse data signal from connection 384 or a test signal from connection 386 is made by a signal, ls_es_rx_obs_sel[13:0]. The output of the reverse multiplexer 376 is provided via connection 378 to the reverse buffer 382. The reverse buffer buffers and amplifies the signal on connection 378 and provides a reverse output over connection 224.

The receive clock multiplexer 394 can receive the forward clock signal over connection 242 and provide an output over connection 398. The connection 396 is coupled to ground, causing the receive clock multiplexer 394 to act as a buffer. The receive clock multiplexer 394 is present in the receiver 244 to demonstrate that the same circuitry can be used as the transmit loopback circuitry and the receiver loopback circuitry, with the differences being in the particular configurations.

As shown in FIGS. 2 and 3A, for each row in the transmitter macro 202 and the receiver macro 204, there is a forward path and a reverse path. In addition, as shown in FIG. 3A, there is a forward loopback path and a reverse loopback path. The forward path 222 routes data from the transmitter macro 202 to the receiver macro 204. The reverse path 224 routes data from the receiver macro 204 to the transmitter macro 202. In addition, there is an additional path allocated for the forwarded clock. When implemented as shown in FIG. 3A, the forward path 222 is also a portion of the forward loopback path and the reverse path 224 is also a portion of the reverse loopback path. In the embodiment shown in FIGS. 2 and 3A, the forward path 222 is the segment of the forward loopback path connecting a single row in the transmitter macro 202 to the receiver macro 204. Specifically, in this example, the forward path 222 is the segment of the forward loopback path that connects TX1 to RX9. Similarly, in this example, the reverse path 224 is the segment of the reverse loopback path that connects RX9 to TX1. The loopback path comprises all the segments and loopback blocks of a row connected to their adjacent channels via a daisy chained configuration.

In addition, there is a selection bus (the signal ls_es_sel_1-pbk_col is the selection mechanism) that determines which column is used to drive this forwarded bus. For example, in FIG. 2, the signal, ls_es_sel_lpbk_col[0:3], is used to choose the column in the transmit macro 202. If no channel is selected, then the selection bus is driven to a constant value to eliminate any switching power in the circuits. If multiple channels are selected, then the data from the transmit channel selected closest to the desired destination is used. The data sent down the forward path 222 can either be the data that is being sent out of the channel, or some other internal signal selected for observation. The selection of which signal is sent down the channel is determined by the test multiplexer 334 in the transmitter 210. In the preferred implementation, this selection can be different for each channel.

For each receiver column 218, there is a selection bit, signal ls_es_loopback[4:0], that determines if the RX channels in that column will use the forwarded data as the receiver's input data instead of the normal data from external to the chip. Note that multiple channels, including all channels, can be selected at one time. If all channels are selected, than all channels can be tested at the same time.

The reverse path 224 routes data from the receiver in the receiver macro 204 toward the transmitter macro 202. The reverse path 224 can also be used to route data from one transmitter to another transmitter as described herein. The reverse path 224 provides observation data that can be driven out of any of the transmitters on the transmitter macro 202. The driver, such as driver 352, in each transmitter is capable of driving very high speed data, and the reverse channel is capable of carrying very high speed data, and as such, a high speed signal can be tested. For each receive channel, there is the ability to either pass the data from earlier in the chain, or to send data selected from that channel. For each transmit channel, there is the ability to either pass data from earlier in the chain, or to select the forward or reverse path or internal signals for observation. In addition, for each transmit channel, there is the ability to drive either its normal output data, or the data from the reverse channel outside the chip. Data from any transmitter in the same row can be placed on any reverse channel. Thus, any transmitter can transmit another transmitter's data from the same row.

As shown in FIG. 3A, the transmitter 210 can provide forward data to the receiver 244 to verify correct behavior of both the transmitter 210 and the receiver 244. Further, an internal data signal, such as the reverse data signal on connection 384, can be sent from the receiver 244 to the transmitter 210, and then be provided over connection 354 outside of the chip for observation. Further still, an internal data signal, such as the forward data signal on connection 314, can be sent down the forward path 222, shunted to the reverse path 224 via the reverse multiplexer 324 and sent outside of the chip using the same or a different transmit driver. In addition, multiple combinations of the above-described functionality can be performed simultaneously. For example, this methodology can be used to observe the behavior of a receive channel via an internal signal to the forwarded data from the transmit side. In an embodiment, a signal can be sent from one of the transmitters to simultaneously test all of the receivers, a signal can be sent from a selected transmitter to a selected receiver and then sent from the selected receiver back to the selected transmitter in a loop-back arrangement, and a signal can be sent from a selected receiver to a selected transmitter and then be sent out of the selected transmitter for observation.

Figure 3B:
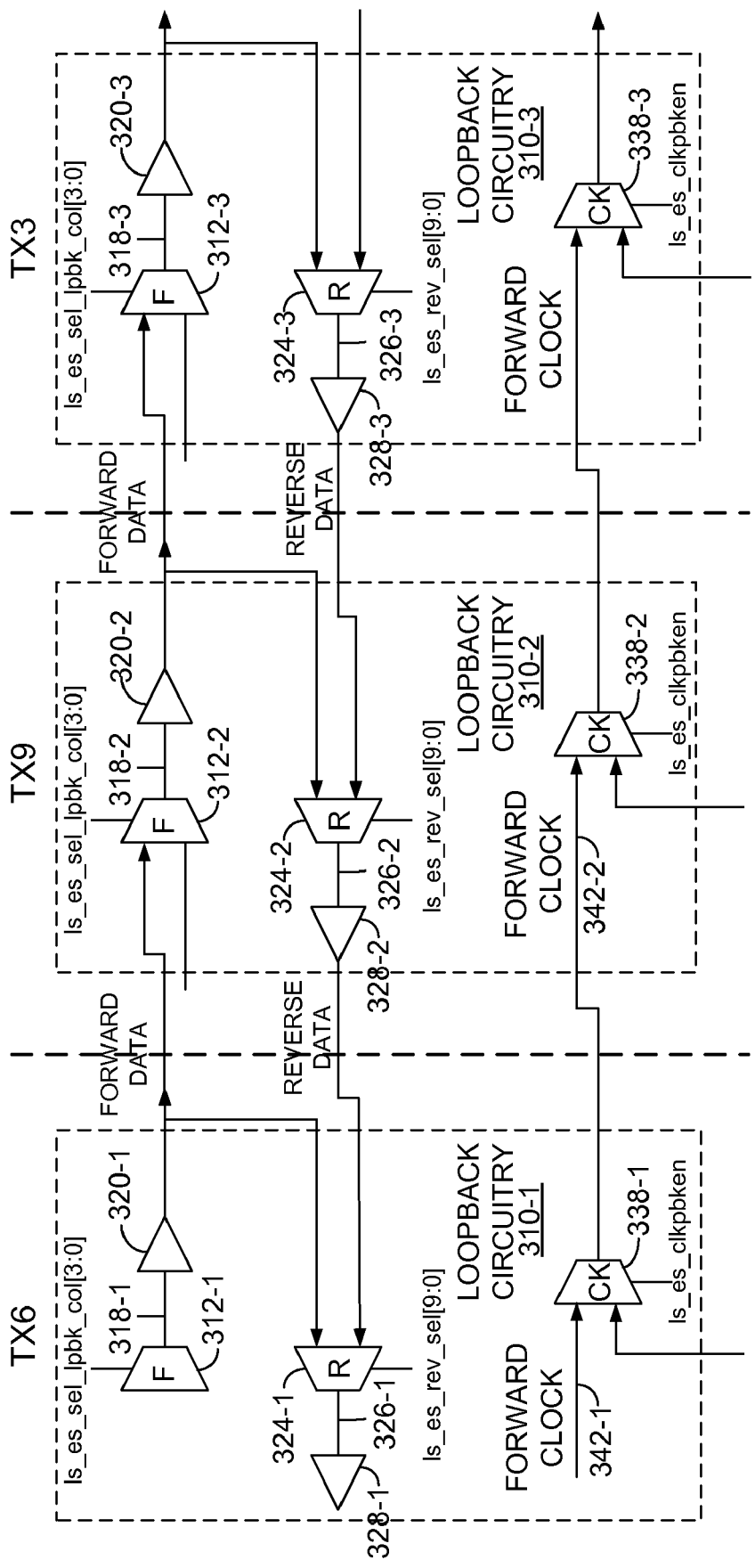
FIG. 3B is a schematic diagram showing an example of a loopback block configured for use in a parallel transmitter macro.

FIG. 3B is a schematic diagram showing an example of a loopback block configured for use in a parallel transmitter macro. The configuration shown in FIG. 3B illustrates multiple transmitters connected in what is referred to as a "daisy chain" configuration in which all transmitters in a particular row are connected together using the loopback circuitry described above. In FIG. 3B, each instance of the loopback circuitry 320 and the elements within the loopback circuitry will be referred to using the designation −1, −2, etc., to refer to different iterations of the loopback circuitry corresponding to different transmitters. For example, in FIG. 3B, transmitters TX6, TX9 and TX3 (FIG. 2) are illustrated.

As shown in FIG. 3B, forwarded data from loopback circuitry 310-1 is sent to loopback circuitry 310-2 from the transmit buffer 320-1 to the forward multiplexer 312-2. Similarly, the forwarded data from loopback circuitry 310-2 is sent to loopback circuitry 310-3 from the transmit buffer 320-2 to the forward multiplexer 312-3, and so on for additional transmitters.

As shown in FIG. 3B, reverse data from loopback circuitry 310-3 is sent to loopback circuitry 310-2 from the reverse buffer 328-3 to the reverse multiplexer 324-2. Similarly, the reverse data from loopback circuitry 310-2 is sent to loopback circuitry 310-1 from the reverse buffer 328-2 to the reverse multiplexer 324-1, and so on for additional receivers.

The forwarded clock signal is sent from the loopback circuitry 310-1 to the loopback circuitry 310-2 from the transmit clock multiplexer 338-1 to the transmit clock multiplexer 338-2. The forwarded clock signal is sent from the loopback circuitry 310-2 to the loopback circuitry 310-3 from the transmit clock multiplexer 338-2 to the transmit clock multiplexer 338-3, and so on for additional transmitters.

Figure 3C:
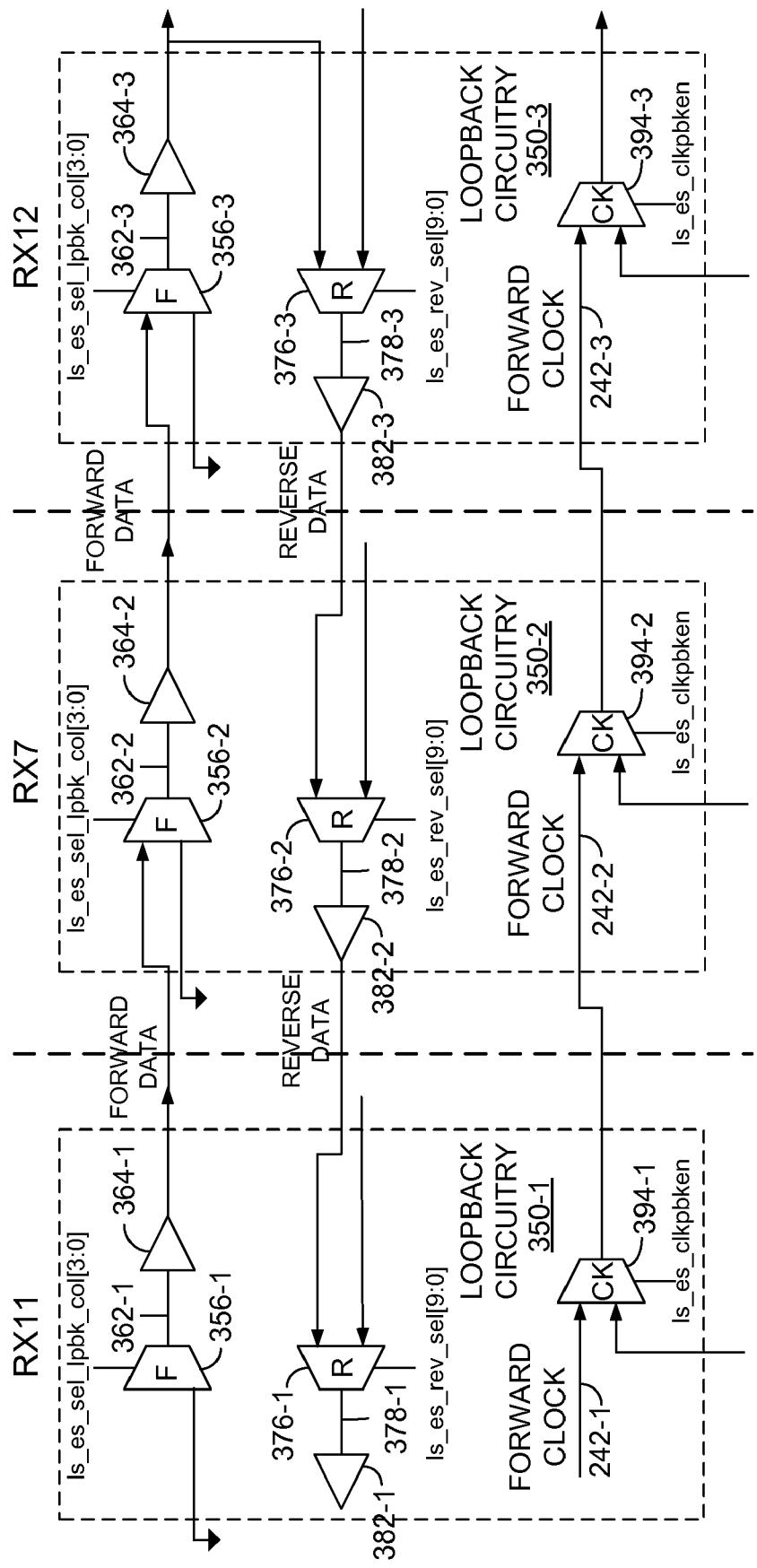
FIG. 3C is a schematic diagram showing loopback block configured for use in a parallel receiver macro.

FIG. 3C is a schematic diagram showing loopback block configured for use in a parallel receiver macro. The configuration shown in FIG. 3C illustrates multiple receivers connected in what is referred to as a "daisy chain" configuration in which all receivers in a particular row are connected together using the loopback circuitry described above. In FIG. 3C, each instance of the loopback circuitry 350 and the elements within the loopback circuitry will be referred to using the designation −1, −2, etc., to refer to different iterations of the loopback circuitry corresponding to different receiver. For example, in FIG. 3C, receivers RX11, RX7 and RX12 (FIG. 2) are illustrated.

As shown in FIG. 3C, forwarded data from loopback circuitry 350-1 is sent to loopback circuitry 350-2 from the receive buffer 364-1 to the forward multiplexer 356-2. Similarly, the forwarded data from loopback circuitry 350-2 is sent to loopback circuitry 350-3 from the receive buffer 364-2 to the forward multiplexer 356-3, and so on for additional receivers.

As shown in FIG. 3C, reverse data from loopback circuitry 350-3 is sent to loopback circuitry 350-2 from the reverse buffer 382-3 to the reverse multiplexer 376-2. Similarly, the reverse data from loopback circuitry 350-2 is sent to loopback circuitry 350-1 from the reverse buffer 382-2 to the reverse multiplexer 376-1, and so on for additional receivers.

The forwarded clock signal is sent from the loopback circuitry 350-1 to the loopback circuitry 350-2 from the receive clock multiplexer 394-1 to the receive clock multiplexer 394-2. The forwarded clock signal is sent from the loopback circuitry 350-2 to the loopback circuitry 350-3 from the receive clock multiplexer 394-2 to the receive clock multiplexer 394-3, and so on for additional receivers.

Figure 4:
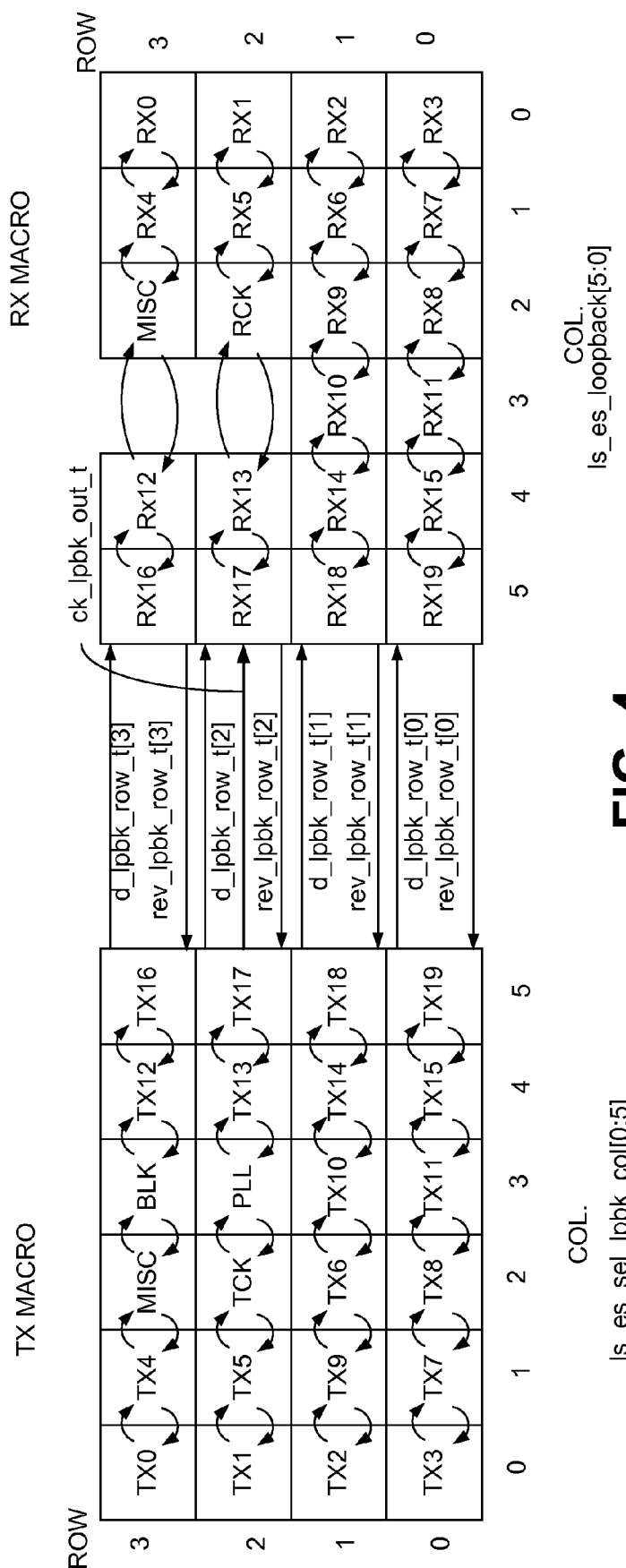
FIG. 4 is a schematic diagram illustrating an example of an alternative implementation of a transmitter macro and a receiver macro of the SERDES circuit of FIG. 1.

FIG. 4 is a schematic diagram illustrating an example of an alternative implementation of a transmitter macro and a receiver macro of the SERDES circuit of FIG. 1. As shown in FIG. 4, there are 20 transmitters and 20 receivers.

Figure 5:
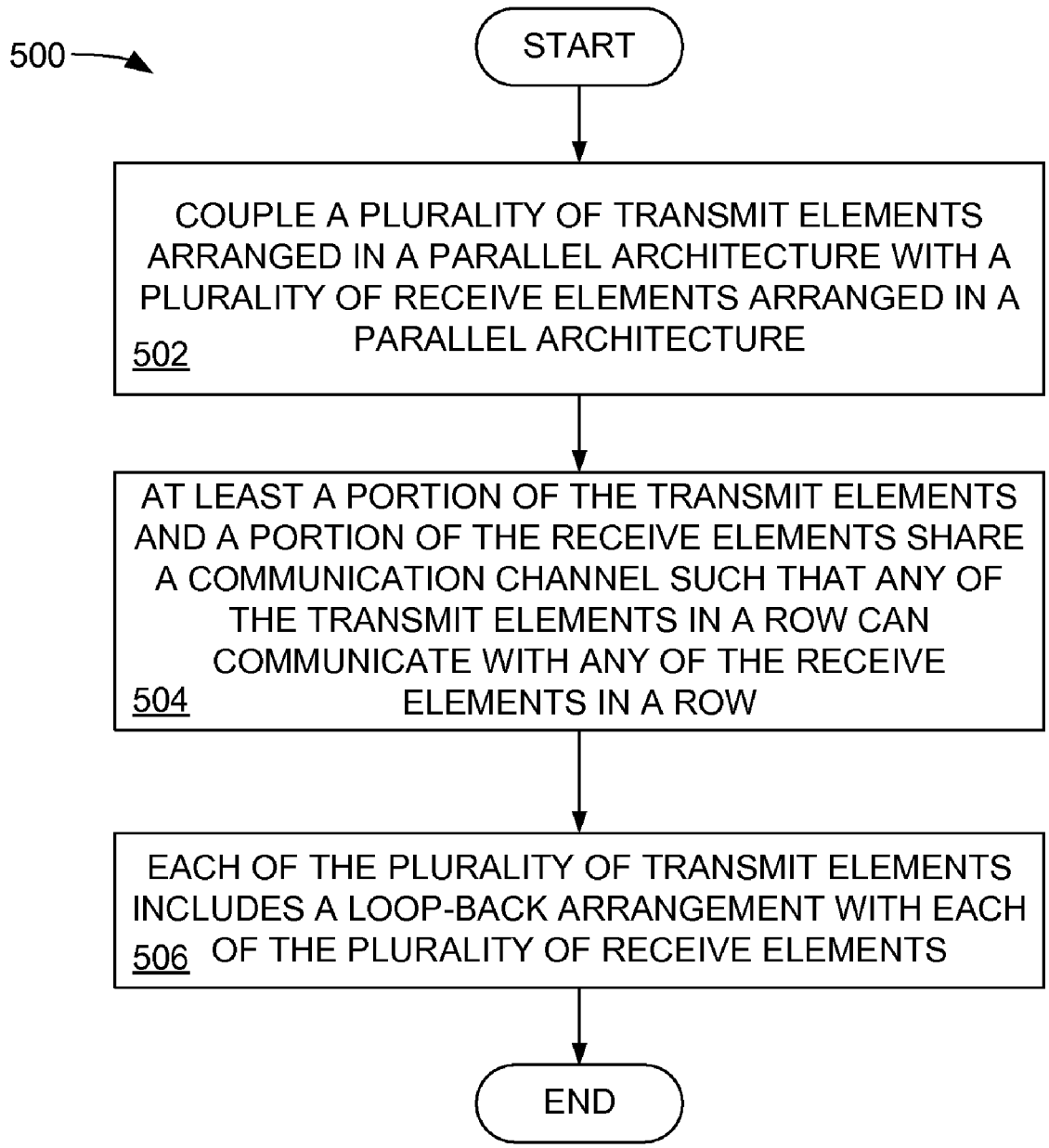
FIG. 5 is a flow chart illustrating loopback operation.

FIG. 5 is a flow chart describing the operation of an embodiment of a method for implementing the internal loopback architecture for parallel SERDES. In block 502, a plurality of transmit elements arranged in a parallel architecture are coupled with a plurality of receive elements arranged in a parallel architecture.

In block 504, at least a portion of the transmit elements and a portion of the receive elements share a communication channel such that any of the plurality of transmit elements in a row can communicate with any of the plurality of receive elements in a row.

In block 506, each of the plurality of transmit elements includes a loop-back arrangement with each of the plurality of receive elements.

This disclosure describes the invention in detail using illustrative embodiments. However, it is to be understood that the invention defined by the appended claims is not limited to the precise embodiments described.

What is claimed is:

1. An internal loop-back architecture for a parallel serializer/deserializer (SERDES), comprising:
a transmitter macro including a plurality of transmit elements arranged in a parallel architecture; and a receiver macro including a plurality of receive elements arranged in a parallel architecture, wherein at least a portion of the transmit elements and a portion of the receive elements share a communication channel and wherein any of the plurality of transmit elements in a row can communicate with any of the plurality of receive elements in a row, and
wherein each of the plurality of transmit elements includes a loop-back arrangement with each of the plurality of receive elements, and
wherein the plurality of transmit elements are individually addressable in a row and column arrangement; and the plurality of receive elements are individually addressable in a row and column arrangement, wherein adjoining transmit elements in a row are coupled together to access the communication channel and wherein adjoining receive elements in a row are coupled together to access the communication channel.

2. The architecture of claim 1, in which the communication channel between a selected transmit element and a selected receive element includes a forward path and a reverse path.

3. The architecture of claim 2, in which the communication channel between a transmit element and a receive element includes a forward clock signal.

4. The architecture of claim 3, in which a signal can be sent from one of the transmit elements to simultaneously test all of the receive elements.

5. The architecture of claim 3, in which a signal can be sent from a selected transmit element to a selected receive element and then sent from the selected receive element back to the selected transmit element in a loop-back arrangement.

6. The architecture of claim 5, in which the signal can be sent out of the selected transmit element for observation.

7. The architecture of claim 3, in which the signal can be sent from a selected receive element to a selected transmit element and then be sent out of the selected transmit element for observation.

8. An internal loop-back architecture for a parallel serializer/deserializer (SERDES), comprising:
a plurality of transmitters arranged in a parallel architecture in which adjoining transmitters can communicate with each other; and a plurality of receivers arranged in a parallel architecture in which adjoining receivers can communicate with each other, wherein at least a portion of the transmitters and a portion of the receivers share a communication channel and wherein any of the plurality of transmitters in a row can communicate with any of the plurality of receivers in a row, and wherein each of the plurality of transmitters includes a loop-back arrangement with each of the plurality of receivers, and wherein the plurality of transmitters are individually addressable in a row and column arrangement; and the plurality of receivers are individually addressable in a row and column arrangement, wherein adjoining transmitters in row are coupled together to access the communication channel and wherein adjoining receivers in a row are coupled together to access the communication channel.

9. The architecture of claim 8, in which the communication channel between a selected transmitter and a selected receiver includes a forward path and a reverse path.

10. The architecture of claim 8, in which the communication channel between a transmitter and a receiver includes a forward clock signal.

11. The architecture of claim 8, in which a signal can be sent from one of the transmitters to simultaneously test all of the receivers.

12. A method for performing internal loop-back testing on a serializer/deserializer (SERDES), comprising:

coupling a plurality of transmit elements arranged in a parallel architecture with a plurality of receive elements arranged in a parallel architecture such that at least a portion of the transmit elements and a portion of the receive elements share a communication channel and such that any of the plurality of transmit elements in a row can communicate with any of the plurality of receive elements in a row, and such that each of the plurality of transmit elements includes a loop-back arrangement with each of the plurality of receive elements, and such that the plurality of transmit elements are individually addressable in a row and column arrangement; and the plurality of receive elements are individually addressable in a row and column arrangement, wherein the method comprises coupling adjoining transmit elements in a row to access the communication channel and coupling adjoining receive elements in a row to access the communication channel.

13. The method of claim 12, in which the communication channel between a selected transmit element and a selected receive element includes a forward path and a reverse path.

14. The method of claim 13, further comprising providing a forward clock signal between a transmit element and a receive element.

15. The method of claim 14, further comprising sending a signal from one of the transmit elements to simultaneously test all of the receive elements.

16. The method of claim 14, further comprising sending a signal from a selected transmit element to a selected receive element and then sent from the selected receive element back to the selected transmit element in a loop-back arrangement.

* * * * *